United States Patent [19]

Takago et al.

[11] Patent Number: 5,342,913

[45] Date of Patent: * Aug. 30, 1994

[54] SILICON RUBBER COMPOSITION HAVING EXCELLENT DURABILITY IN REPEATED MOLD RELEASE

[75] Inventors: Toshio Takago; Hiroshi Inomata; Shinichi Sato; Hitoshi Kinami, all of Annaka, Japan

[73] Assignee: Shin-Etsu Chemical Co., Ltd., Tokyo, Japan

[*] Notice: The portion of the term of this patent subsequent to Mar. 8, 2011 has been disclaimed.

[21] Appl. No.: 92,807

[22] Filed: Sep. 29, 1993

Related U.S. Application Data

[63] Continuation-in-part of Ser. No. 798,100, Nov. 27, 1991, abandoned.

[30] Foreign Application Priority Data

Nov. 29, 1990 [JP] Japan .................... 2-331209

[51] Int. Cl.$^5$ .............................................. C08G 77/06
[52] U.S. Cl. ........................................ 528/15; 528/42
[58] Field of Search ................................ 528/15, 42

[56] References Cited

U.S. PATENT DOCUMENTS

| | | | |
|---|---|---|---|
| 4,057,566 | 11/1977 | Carter et al. | 556/434 |
| 4,100,136 | 7/1978 | Carter et al. | 525/478 |
| 4,985,526 | 1/1991 | Kishita et al. | 528/31 |
| 5,073,422 | 12/1991 | Konno et al. | 528/31 |

FOREIGN PATENT DOCUMENTS

| | | |
|---|---|---|
| 0208239 | 1/1987 | European Pat. Off. |
| 0311262 | 4/1989 | European Pat. Off. |
| 0393984 | 10/1990 | European Pat. Off. |
| 0458617 | 11/1991 | European Pat. Off. |
| 2337731 | 8/1977 | France |

*Primary Examiner*—Melvyn I. Marquis
*Attorney, Agent, or Firm*—Nixon & Vanderhye

[57] ABSTRACT

An addition-curable type rubber composition comprising a vinyl-containing organopolysiloxane as a base polymer and, particularly, further comprising as a crosslinking agent an organohydrogenpolysiloxane which contains, in its molecule, at least one unit having the following formula:

$$O_{\frac{3-a}{2}}\underset{|}{\overset{(CH_3)_a}{Si}}-J-Rf-J-\underset{|}{\overset{(CH_3)_a}{Si}}O_{\frac{3-a}{2}}$$

wherein J is an alkylene group of from 2 to 4 carbon atoms, Rf is a perfluoropolyether group, and a is an integer of from 0 to 2. The composition has excellent durability in repeated mold release, and a mold prepared from the composition is able to produce moldings of constant quality even when molding is repeated a large number of times.

6 Claims, 1 Drawing Sheet

SILICON RUBBER COMPOSITION HAVING EXCELLENT DURABILITY IN REPEATED MOLD RELEASE

CROSS-REFERENCE TO RELATED APPLICATION

This application is a continuation-in-part application of U.S. patent application 07/798,100 filed on Nov. 27, 1991 now abandoned.

BACKGROUND OF THE INVENTION

1. Field of the Invention

The present invention relates to an addition-curable type silicone rubber composition, and mole particularly to a silicone rubber composition having excellent durability in repeated mold release.

2. Description of the Prior Art

Silicone rubber compositions, due to their excellent mold release properties, chemical resistance, heat resistance and curability, are widely used as, for instance, materials for rubber mold for molding resins such as urethane, epoxy, polyester and vinyl chloride resins and so-called pattern-making silicone rubber mold materials. The silicone rubber compositions are used also as a rubber material for fixing rolls in dry-type copying machine.

In recent years, however, the requirements for durability in repeated mold release have grown to such a level that none of the conventional silicone rubber compositions can meet the requirements satisfactorily. Namely, when a silicone rubber mold according to the prior art is subjected to repeated molding and demolding, the mold surfaces are deteriorated as the repetition number increases; consequently, for example, the resin moldings obtained will have unsatisfactory surface gloss. Therefore, there is a request for a silicone rubber mold material which enables stable production of molded articles of constant quality even when the molding and demolding cycle is repeated a large number of times, that is, a silicone rubber mold material which has excellent durability in repeated mold release.

In order to improve the durability of silicone rubber mold materials in repeated mold release, the use of an organopolysiloxane having a fluorine atom in its molecule has been proposed. However, this is often accompanied by degradation of rubber properties such as water repellency, oil repellency, curability, heat resistance, etc., and no satisfactory improvement has been obtained.

SUMMARY OF THE INVENTION

Accordingly, it is an object of the present invention to provide a silicone rubber composition having an improved durability in repeated mold release while retaining the excellent properties of silicone rubber, such as high curability, heat resistance, etc.

According to the present invention, there is provided a silicone rubber composition comprising:

(a) an organopolysiloxane containing at least two alkenyl groups in its molecule and having the following general formula (1):

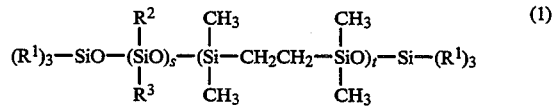

wherein s and t are each an integer from 0 to 10,000 such that s+t has a value in the range from 100 to 10,000, and $R^1$ to $R^3$ may be the same or different from each other and each are an unsubstituted monovalent hydrocarbon group of from 1 to 9 carbon atoms;

(b) an organohydrogenpolysiloxane having at least five Si—H bonds and containing at least: one unit of the following general formula (2):

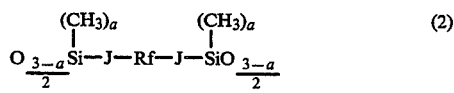

wherein a is an integer from 0 to 2, J is a divalent hydrocarbon group of from 2 to 4 carbon atoms, and Rf is a divalent perfluoropolyether group of from 6 to 36 carbon atoms, in its molecule; and (c) an addition reaction catalyst.

The silicone rubber composition according to the present invention is an addition-curable type composition comprising a specified fluorine-containing organohydrogenpolysiloxane (component (b)) in combination with an alkenyl group-containing organopolysiloxane (component (a)). More specifically, it is a characteristic feature of the composition of the present invention that an organopolysiloxane containing alkenyl groups but not containing a fluorine-containing group is used as an alkenyl group-containing organopolysiloxane. That is, in order to obtain a pattern-making mold having excellent durability in repeated mold release by use of an addition-curable silicone rubber composition comprising an alkenyl group-containing organopolysiloxane as base component, heretofore it has been necessary that the organopolysiloxane should be or comprise one which has a fluorine-containing group and which is expensive. Such a composition is unadvantageous economically. There has been a proposal for using, as a crosslinking agent in the above type curable composition, an organohydrogenpolysiloxane which has a fluorine-containing group. In that case, also, an alkenyl group-containing organopolysiloxane which has a fluorine-containing group must be used in the composition, from the viewpoint of compatibility with the organohydrogenpolysiloxane (crosslinking agent). If an alkenyl group-containing organopolysiloxane which does not have a fluorine-containing group is used in combination with the organohydrogenpolysiloxane having a fluorine-containing group, the resulting composition cannot have an improved durability in repeated mold release necessary for a pattern-making mold.

In view of the above circumstances of the prior art, therefore, it is an unexpected achievement that the silicone rubber composition of the present invention which comprises an alkenyl group-containing organopolysiloxane not having any fluorine-containing group exhibits an improved durability in repeated mold release.

The silicone rubber composition of the present invention is markedly useful as rubber materials for producing pattern-making silicone rubber mold used in vacuum casting or the like, fixing rolls in dry-type copying machines, etc.

Figure 1:
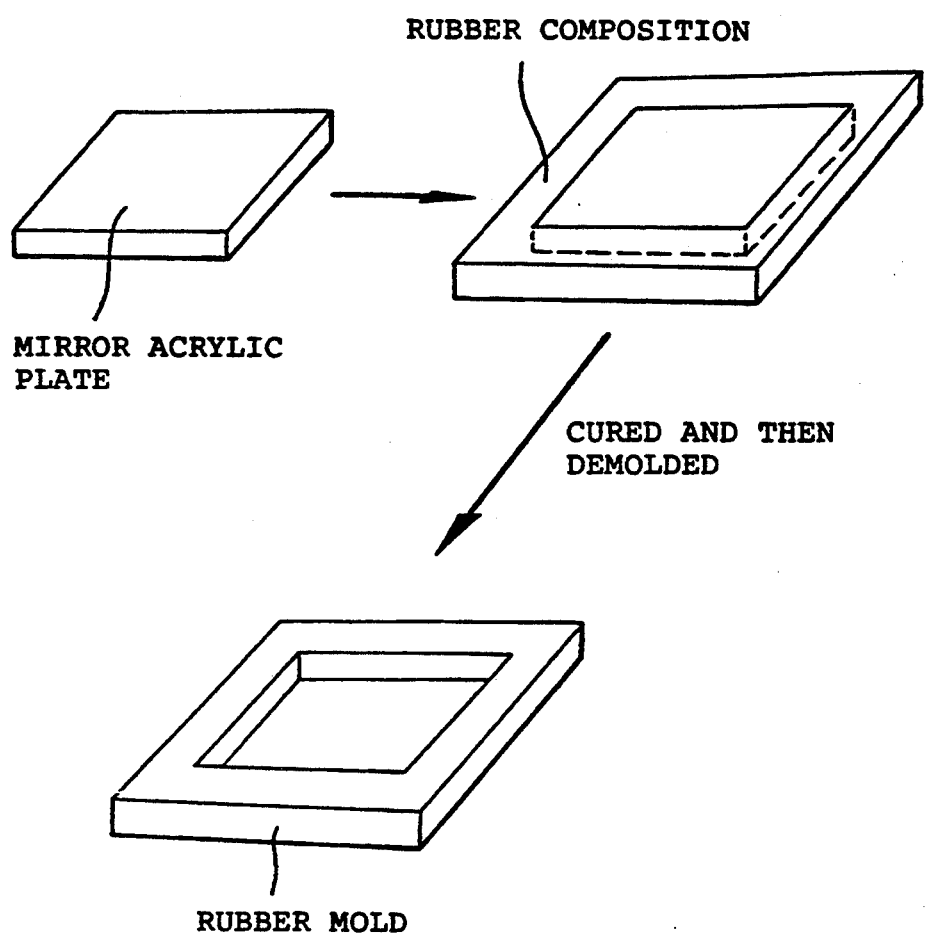
FIG. 1 is an illustration of a process for producing a rubber mold from rubber compositions prepared in Examples.

DETAILED DESCRIPTION OF THE INVENTION (a) Alkenyl group-containing organopolysiloxane In the composition according to the present invention, the organopolysiloxane of component (a) used as base polymer has the above general formula (1), and is characterized in that it has at least two alkenyl groups and it does not have any fluorine-containing group.

That is, in the above general formula (1), the unsubstituted monovalent hydrocarbon groups $R^1$ to $R^3$ of from 1 to 9 carbon atoms comprise at least two alkenyl groups, per molecule.

The alkenyl groups include, for example, vinyl, allyl, isopropyl, cyclopentyl and cyclohexyl, etc., of which the most preferred is the vinyl group in view of easy synthesis and economy. Fox obtaining a suitable rubber elasticity upon cure, the unsaturated aliphatic groups are preferably used in an amount such that the total amount of the alkenyl group-containing siloxane units is from 0.001 to 2 mol %, more preferably from 0.005 to 1 mol %, based on the component (a). Furthermore, the alkenyl groups may each be present at either a terminal end or an intermediate position of the molecular chain.

Of the monovalent hydrocarbon groups $R^1$ to $R^3$, the other groups than the alkenyl include, for example, alkyl groups such as methyl, ethyl, propyl, butyl, pentyl, hexyl, octyl and the like; aralkyl groups such as 2-phenylethyl, 2-phenylpropyl and the like; and aryl groups such as phenyl and the like. Among these, particularly preferred are methyl and phenyl groups.

The polymerization degree of the organopolysiloxane as above is preferably such that the number of the siloxane units is 100 or more, in order for the organopolysiloxane to have a suitable elongation for practical use as a rubber material. However, an organopolysiloxane having a lower polymerization degree can be used together. Further, monodisperse polymers and polymers with a broad molecular weight distribution can also be used.

Where the composition of the present invention is used as a liquid rubber, called RTV or LIMS, it is preferable that the foregoing organopolysiloxane contains methyl groups in an amount of more than 50 mol %, based on all the organic groups bonded to silicon atoms, and has a viscosity at 25° C. of from 500 to 50,000 cP, from the viewpoint of workability or the like.

The organopolysiloxane for use in the present invention is exemplified by, but not limited to, the following compounds (in the formulas below, Vi stands for the vinyl group):

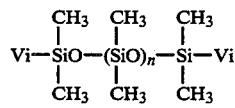

wherein n is an integer of from 100 to 10,000;

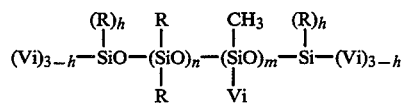

wherein h is an integer from 0 to 3, m+n is an integer from 100 to 10,000, and R are each a $C_1$ to $C_9$ hydrocarbon group such as alkyl, aryl, etc.; and

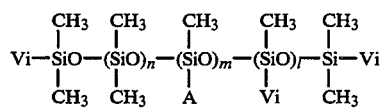

wherein l+m+n is an integer from 100 to 10,000.

Of the organopolysiloxanes as above, those containing the unit —(SiCH$_2$CH$_2$SiO)— preferably contain the unit in an amount of 50 mol % or above, more preferably 70 mol % or above, and the use of such organopolysiloxane enables the silicone rubber composition to have an improved strength.

The above organopolysiloxanes can be produced by conventionally known processes. For instance, the organopolysiloxanes can be synthesized from cyclic siloxanes such as the followings:

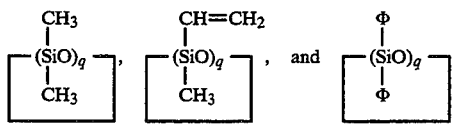

wherein q is an integer of from 3 to 8, and $\Phi$ is the phenyl group. Namely, the above organopolysiloxanes can be produced by bringing the suitable cyclic siloxane or siloxanes to homopolymerization or copolymerization in the presence of a catalyst, such as LiOH, NaOH, KOH or silanolate thereof, to prepare a polymer with a suitable polymerization degree, and silylating the molecular ends of the polymer by use of, for example,

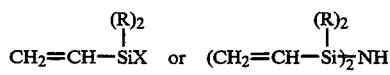

wherein X is a halogen atom or

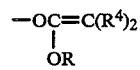

where R is as defined above, and $R^4$ is a hydrogen atom or a lower alkyl group.

Also, among the organopolysiloxanes above, dimethylpolysiloxanes can be produced in the following manner. A mixture of the above cyclic siloxanes together with

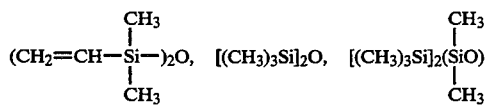

or the like is subjected to equilibration reaction in the presence of the above-mentioned catalyst, a basic catalyst such as $(CH_3)_4NOH$, $(C_4H_9)_4POH$, etc. or an acid catalyst such as sulfuric acid, fuming sulfuric acid, organic sulfonic acid, etc. at a temperature of from 0 to 200° C. for several tens of minutes to 24 hours, thereby carrying out polymerization to produce a polymer. The catalyst is then deactivated through neutralization, heat treatment, water washing and the like steps, and the reaction product mixture is subjected to purification by stripping of lower-molecular compounds, an active carbon-treatment, filtration, etc., to obtain the desired organopolysiloxane.

(b) Organohydrogenpolysiloxane

The organohydrogenpolysiloxane used in the present invention to function as a crosslinking agent has at least five Si—H bonds in its molecule and contains at least one unit of the above general formula (2):
wherein J, Rf and a are as defined above, in its molecule. The use of the organohydrogenpolysiloxane having a perfluoropolyether fluoropolyether group as a crosslinking agent leads to an improved durability in repeated mold release, without spoiling the excellent properties of silicone rubber.

The divalent hydrocarbon group J in the above general formula includes, for example, alkylene groups of from 2 to 4 carbon atoms. More preferable examples of the alkylene groups include the following: —CH$_2$—CH$_2$—, —CH$_2$CH$_2$CH$_2$—, and

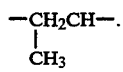

The divalent fluorine-containing organic group Rf include, for example, perfluoropolyether groups, of which especially preferred are those having from 6 to 36 carbon atoms. Also preferred are the groups having the following formula:

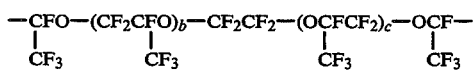

wherein b and c are each an integer from 0 to 5, provided the total number of carbon atoms in this formula is in the range from 6 to 36.

In order to develop excellent durability in repeated mold release, particularly preferred of the above Rf groups for use in the present invention are those having at least 11 carbon atoms, more preferably from 11 to 18 carbon atoms.

Besides, in the present invention, the above-described organohydrogenpolysiloxane must contain at least five Si—H bonds in its molecule. If the number of Si—H bonds per molecule is less than 5, the resulting composition shows a lowered crosslink density upon cure, so that satisfactory durability in repeated mold release cannot be obtained.

Some typical, but not limitative, examples of the organohydrogenpolysiloxane for use in the present invention are set forth below.

The organohydrogenpolysiloxanes as described above can be produced by processes which art known per se.

For instance, a halosilane corresponding to the objective organohydrogenpolysiloxane and having the formula:

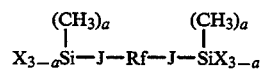

wherein X is a halogen atom, such as chlorine, and J, Rf and a are as defined above, or the like is brought into co-hydrolysis with a silane such as H(CH$_3$)$_2$SiX, H(CH$_3$)SiX$_2$, (CH$_3$)$_2$SiX$_2$, etc. in amounts according to a molecular design, whereby the objective organohydrogenpolysiloxane can be produced. The organohydrogenpolysiloxane can also be prepared by another process in which, for example, the above halosilane and a siloxane oligomer such as [H(CH$_3$)$_2$Si]$_2$O, [H(CH$_3$)Si-O]$_q$, [(CH$_3$)$_2$SiO]$_q$ (where q is a positive integer), etc. are subjected to co-hydrolysis in the presence of an acid catalyst such as hydrochloric acid, sulfuric acid, etc., or are subjected to the co-hydrolysis followed by equilibration reaction. The compound obtained in this manner is purified through a suitable combination of neutralization, water washing, stripping, distillation, active carbon treatment, filtration and the like steps, before put to use.

The organohydrogenpolysiloxanes as described above can be used either singly or in combination of two or more. In general, the organohydrogenpolysiloxane is used in an amount of from 0.1 to 50 parts by weight per 100 parts by weight of the organopolysiloxane present as the foregoing component (a). Preferably, the organohydrogenpolysiloxane is used in an amount such as to supply from 0.5 to 5.0 moles of Si—H bonds, more preferably from 1.0 to 3.0 moles of Si—H bonds, per mole of the unsaturated aliphatic groups present in the whole composition. Where the amount of the organohydrogenpolysiloxane is too small, the cured rubber obtained may be a gel-like matter with a low crosslink density, and may have unsatisfactory strength and mold release properties. On the other hand, excessively large amounts tend to cause foaming at the time of cure or to result in that the cured rubber is unsatisfactory as to durability in repeated mold release and heat resistance.

Furthermore, the above organohydrogenpolysiloxane can be used in combination with other organohydrogenpolysiloxanes which do not contain perfluoropolyether group and which have been conventionally used as a crosslinking agent for compositions of this type. In such an instance, also, it is preferable that the molar ratio of the total amount of Si—H bonds to the total amount of unsaturated aliphatic groups is in the above-described range. In order to obtain a transparent cured rubber, in the present invention, it is preferable to select an organohydrogenpolysiloxane which is compatible with the organopolysiloxane used as the component (a).

(c) Addition reaction catalyst

According to the present invention, an addition reaction catalyst is used to accelerate the addition curing reaction (hydrosilylation) between the above components (a) and (b).

As the addition reaction catalyst, those catalysts conventionally used in addition-curable type silicone rubber compositions can be used, for example, platinum catalysts such as chloroplatinic acid, complexes of chloroplatinic acid with an olefin, e.g. ethylene, or with an alcohol or vinylsiloxane (See U.S. Pat. Nos. 3,220,972 and 3,775,452), and solid catalysts such as platinum supported on silica, alumina, carbon, etc. In addition to the platinum catalysts, there have also been known other metal catalysts comprising a platinum family metal such as rhodium, ruthenium, iridium and palladium, for example, $RhCl(PPh_3)_3$, $RhCl(CO)(PPh_3)_2$, $Ru_3(CO)_{12}$, $IrCl(CO)(PPh_3)_2$, $Pd(PPh_3)_4$, etc. These catalysts can also be used as the addition reaction catalyst in the present invention. In order to obtain a uniform cured product, in general, chloroplatinic acid and complexes of chloroplatinic acid are used preferably.

These catalysts may be used in a so-called catalytic amount, for example, from 1 to 1000 ppm, preferably from 10 to 500 ppm.

Other ingredients

The composition of the present invention, if necessary, can incorporate various additives which are known per se.

For example, in order to augment the strength of the elastic mass obtained as the cured product of the composition, organopolysiloxanes of a resin structure composed of $SiO_2$ units, $CH_2=CH(R'_2)SiO_{0.5}$ units and $R'_3SiO_{0.5}$ units, wherein R' is a monovalent hydrocarbon group which does not contain an aliphatically unsaturated double bond (Refer to Japanese Patent Publication (KOKOKU) Nos. 38-26771 (1963) and 45-9476 (1970)) can be compounded in the composition. Also, for the purpose of controlling the cure rate of the composition, polysiloxanes containing $CH_2=CHRSiO$ units, wherein R has the same meaning as the above R' (See Japanese Patent Publication (KOKOKU) No. 48-10947 (1973)), acetylene compounds (Refer to U.S. Pat. No. 3,445,420 and Japanese Patent Publication (KOKOKU) 54-3774 (1979)), heavy metal ionic compounds (See U.S. Pat. No. 3,532,649), and so on can be incorporated in the composition. Furthermore, organopolysiloxanes with no functionality can be added to the composition in suitable amounts, so as to enhance thermal shock resistance, flexibility or the like. Where these additives are corporated into the composition, it is yet desirable that the amount of the Si—H bonds be from 0.5 to 5 moles, preferably from 1.0 to 3.0 moles, per mole of the total amount of silicon-bonded unsaturated aliphatic groups present in the composition.

Moreover, a suitable amount of filler can be added to the composition of the present invention, in order to reduce heat shrinkage at the time of curing, to lower the coefficient of thermal expansion of the elastic mass obtained upon cure, to enhance the thermal stability, weatherability, chemical resistance, flame resistance or mechanical strength of the cured product, or to obtain a lower gas permeability. Such filler includes, for example, metallic oxides such as fumed silica, quartz powder, glass fibers, carbon, iron oxide, titanium oxide, cerium oxide, etc., and metallic carbonates such as calcium carbonate, magnesium carbonate and so on. Furthermore, suitable pigment, dye or antioxidant can also be incorporated in the composition, as required.

Silicone rubber composition

The silicone rubber composition according to the present invention, comprising the components as above, can be cured at room temperature in some cases, which depend on the kind of the functional groups in the organopolysiloxane of component (a) and the kind of the catalyst of component (c). In general, however, the silicone rubber composition of the invention cures at a temperature of from 50° to 200° C. in a period ranging from several hours to several minutes, to give a rubber-like elastic cured product.

The composition can be used after dissolved in a suitable organic solvent such as toluene, xylene, etc. in a desired concentration, according to the intended use of the composition.

The silicone rubber composition of the present invention gives a rubberlike elastic cured product having high strength and excellent transparency, and is therefore extremely useful for such applications as core, cladding or coating of optical fiber, etc. In addition, the composition of the present invention has the characteristic features of capability to forms thin film, excellent mold release properties, high insulation resistance and low water absorption. Therefore, the composition is applicable also to gas or liquid separation film, mold release agent, pattern-making RTV, electrical insulation potting, or adhesive in combination with an adhesive aid, or further to silicone gel for electrical insulation or shock-absorbing purposes, etc. Further, the silicone rubber composition of the present invention can give a cured product of high elongation and strength, without any filler therein, and is applicable to high fatigue resistance rubber, such as nipples, rubber conductors, etc., high water pressure resistance fiber-treating agent, and so on.

EXAMPLES

In the following examples, "parts" means "parts weight" and the viscosity values are measurements at 25° C. Further, "Vi" used in the formulas stands for the vinyl group.

Examples 1 and 2, Comparative Examples 1 to 3

(1) 100 parts of an organopolysiloxane having the following formula:

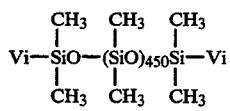

with a viscosity of 5000 cSt and a vinyl group content of 0.0065 mole/100 g, (2) 0.2 part of a toluene solution of a platinum compound obtained by reaction of chloroplatinic acid with $[Vi(CH_3)_2Si]_2O$, having a platinum concentration of 1.0% and a chlorine content of 50 ppm or below, and (3) 0.1 part of a cyclotetrasiloxane having the formula $[Vi(CH_3)SiO]_4$, were mixed uniformly to obtain a transparent liquid composition.

Next, the following organohydrogenpolysiloxanes A to E were each added as a crosslinking agent to the above liquid composition, in the respective amounts given in Table 1 below, followed by mixing uniformly and defoaming, to obtain five rubber compositions.

A:

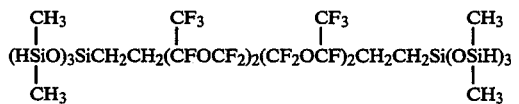

B:

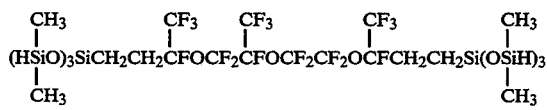

C:

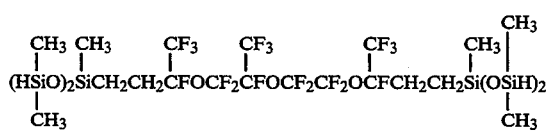

D:

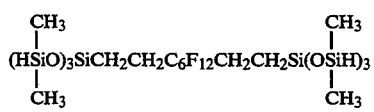

E:

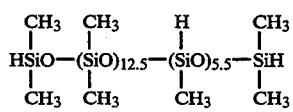

All of the five rubber compositions have good transparency.

Further, each of the rubber compositions was poured into a mold measuring 130×170×2.0 mm, and cured at 100° C. for 60 minutes to form an elastomer sheet. Each sheet thus obtained was subjected to measurement of hardness and measurement of contact angle between the sheet and water as well as between the sheer and a silicone oil (KF-96, a product by Shin-Etsu Chemical Co., Ltd.; viscosity 10 cSt). In addition, each elastomer sheet was tested for mold release property after pouring an epoxy resin (CEP-5, a product by Kokusai Chemical) onto the surface of the sheet and curing the resin at 80° C. for 90 minutes. The results are given in Table 1.

TABLE 1

| Example | Cross-linking agent | Addition amount (parts) | Hardness | Contact angle (degrees) | | Mold release property |
|---|---|---|---|---|---|---|
| | | | | water | oil | |
| 1 | A | 2.3 | 21 | 111 | 18 | good |
| 2 | B | 1.6 | 22 | 110 | 16 | good |
| Comp. Ex. 1 | C | 2.5 | 20 | 106 | 18 | good |
| Comp. Ex. 2 | D | 1.9 | 20 | 107 | 13 | good |
| Comp. Ex. 3 | E | 2.5 | 18 | 103 | wetted | good |

The hardness measurement was carried out on a Type A spring hardness tester according to JIS K-6301.

The above results show that the crosslinking agents A to D are compatible with the organopolysiloxane (a).

Examples 3 and 4, Comparative Examples 4 to 6

A pasty composition comprising:
(1) 92.5 parts of the same organopolysiloxane as that used as (1) in Example 1;
(2) 0.1 part of a 2-ethylhexanol modified chloroplatinic acid catalyst (platinum concentration: 2.0%);
(3) 0.1 part of a cyclotetrasiloxane having the formula $[Vi(CH_3)SiO]_4$;
(4) 7.5 parts of a toluene-soluble silicone resin composed of $SiO_2$ units, $Vi(CH_3)_2SiO_{\frac{1}{2}}$ units and $(CH_3)_3SiO_{\frac{1}{2}}$ units (vinyl group content: 0.09 mole/100 g); and
(5) 2.5 parts of water-repellent fumed silica having surfaces treated with $[(CH_3)_3Si]_2NH$ (specific surface area: 170 m²/g) and having a viscosity of about 1000 poise was prepared.

The organohydrogenpolysiloxanes A to E used in the above examples were each added as a crosslinking agent to the pasty composition, in respective amounts given in Table 2 below, to prepare rubber compositions.

Using each of the rubber compositions, sheets 2 mm thick were prepared similarly to Examples 1 and 2, and cured at room temperature for 3 days. Further, the rubber compositions were subjected to molding curing at room temperature for 3 days and demolding, by use of an acrylic mirror plate (50×50×5 mm) as shown in FIG. 1, to obtain rubber molds (60×60×10 mm).

The rubber sheets thus prepared were used as specimens for measurement of mechanical strength and rubber properties. In addition, molds casting a urethane resin (tradename: Placast UW, a product by Nisili Co., Ltd.) was carried out to determine the durability of the molds in repeated mold release.

The durability in repeated mold release was evaluated as follows. When put to repeated molding and demolding, a silicone rubber mold undergoes surface deterioration, leading to a loitering in the surface gloss of the molded resin articles. Taking this into account, measurement of surface gloss of the molded resin article was carried out on each molding and demolding cycle, and the measured surface gloss was used for determining the degree of deterioration of the relevant rubber mold, and was used as a criterion in evaluation of durability in repeated mold release.

The results are shown in Table 2.

TABLE 2

|  | Example | | Comp. Ex. | | |
|---|---|---|---|---|---|
|  | 3 | 4 | 4 | 5 | 6 |
| Crosslinking agent | A | B | C | D | E |
| Addition amount (parts) | 2.6 | 2.2 | 2.9 | 1.8 | 3.1 |
| Properties of cured rubber |  |  |  |  |  |
| Specific gravity | 1.11 | 1.11 | 1.11 | 1.10 | 1.10 |
| Hardness (JIS A) | 41 | 43 | 31 | 42 | 40 |
| Elongation (%) | 320 | 300 | 450 | 310 | 330 |
| Tensile strength (kg/cm$^2$) | 50 | 52 | 48 | 50 | 51 |
| Tear strength A (kg/cm$^2$) | 15 | 15 | 11 | 14 | 15 |
| Surface gloss of molded article (%) |  |  |  |  |  |
| Beginning stage | 100 | 100 | 100 | 100 | 100 |
| After 10 molding runs | 99 | 99 | 97 | 98 | 98 |
| After 20 molding runs | 98 | 96 | 89 | 92 | 89 |
| After 30 molding runs | 94 | 91 | 76 | 78 | 78 |
| After 40 molding runs | 86 | 72 | 51 | 56 | 52 |

It is evident from the above results that the composition containing the crosslinking agent A is especially excellent. Where the durability in repeated mold release is judged using a surface gloss level of 90% as a criterion, in the case of the rubber mold formed from this composition, the number of molding runs meeting the criterion ranges up to about 40, whereas the rubber mold formed from the composition containing the crosslinking agent E, which is outside the scope of the present invention, appears to have a corresponding durability value of about 20 molding runs. This comparison indicates an about 100% improvement in durability in repeated mold release.

Example 5

(1) 100 parts of an organopolysiloxane having the following formula:

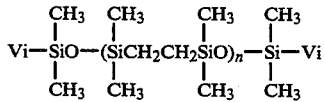

with a viscosity of 4800 cSt and a vinyl group content of 0.009 mole/100 g, (2) 0,2 part of the same platinum catalyst as that used as (2) in Example 1, and (3) 0.1 part of a cyclotetrasiloxane having the formula [Vi(CH$_3$)SiO]$_4$ were mixed together uniformly. To the resulting mixture, the above crosslinking agent B was added in the amount given in Table 3 below, to prepare a rubber composition.

The rubber composition was applied to a polyethylene terephthalate film (210×296×5 mm) in a thickness of about 100 μm and cured at 100° C. for 60 minutes. On the film thus coated, a silicone rubber form 50×100×5 mm in inner dimensions was fixed by jigs, then a urethane resin (tradename: Quinete 999, a product by Nippon Zeon Co., Ltd,) was poured into the thus fabricated cavity, and cured at 60° C. for 40 minutes.

Upon completion of the curing, the rubber form was removed, and after cooling to room temperature, the peel force required for releasing the molded urethane resin article from the coated film and the surface gloss of the molded article were measured. This operation was repeated using the coated film, for evaluation of durability in repeated mold release. The results are given in Table 3.

TABLE 3

|  | Example 5 | |
|---|---|---|
| Crosslinking agent | B | |
| Addition amount | 2.2 | |
| Durability in repeated mold release | Peel force (g/50 mm width) | Gloss (%) |
| Beginning stage | 2 | 100 |
| After 10 molding runs | 4 | 99 |
| After 20 molding runs | 2 | 97 |
| After 30 molding runs | 3 | 98 |
| After 40 molding runs | 3 | 97 |

Comparative Example 7

A composition comprising (1) 100 parts of an organopolysiloxane having the following formula:

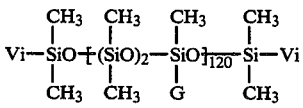

wherein G is

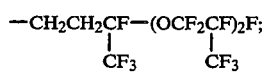

(2) 0.58 part of the crosslinking agent B;

(3) 0.2 part of a platinum catalyst which the same as the platinum catalyst used in Example 2 except for replacing the solvent by m-xylene hexafluoride (platinum concentration: 0.5%); and (4) 0.05 part of a cyclotetrasiloxane having the formula [Vi(CH$_3$)SiO]$_4$ was prepared. In the same manner as in Example 5, the composition was applied to a polyethylene terephthalate film and cured. Then, a test for determining durability in repeated release was carried out using a urethane resin, in the same manner as in Example 5. The results are given in Table 4.

TABLE 4

|  | Comp. Ex. 7 | |
|---|---|---|
| Durability in repeated mold release | Peel force (g/50 mm width) | Gloss (%) |
| Beginning stage | 3 | 100 |
| After 10 molding runs | 4 | 98 |
| After 20 molding runs | 7 | 98 |
| After 30 molding runs | 11 | 92 |
| After 40 molding runs | 25 | 88 |

We claim:

1. A silicone rubber composition comprising:
   (a) an organopolysiloxane containing at least two alkenyl groups in its molecule and having the following general formula (1):
   wherein s and t are each an integer from 0 to 10,000 such that s+t has a value in the range from 100 to 10,000, and R$^1$ to R$^3$ may be the same or different from each other and each are an unsubstituted monovalent hydrocarbon group of from 1 to 9 carbon atoms;

(b) an organohydrogenpolysiloxane having at least five Si—H bonds and containing at least one unit of the following general formula (2):
wherein a is an integer from 0 to 2, J is a divalent hydrocarbon group of from 2 to 4 carbon atoms, and Rf is a divalent perfluoropolyether group of from 6 to 36 carbon atoms, in its molecule; and (c) an addition reaction catalyst.

2. The composition of claim 1, wherein the component (b) comprises an organohydrogenpolysiloxane having at least five Si—H bonds and containing at least one unit of the above-defined general formula (2) wherein said Rf is a divalent perfluoropolyether group of at least 11 carbon atoms.

3. The composition of claim 2, wherein said Rf has from 11 to 18 carbon atoms.

4. The composition according to claim 1, wherein the organohydrogenpolysiloxane (b) is present in an amount of from 0.1 to 50 parts by weight per 100 parts by weight of the organopolysiloxane (a).

5. The composition according to claim 1, wherein the organohydrogenpolysiloxane (b) is present in an amount such that the total amount of Si—H bonds in the composition is from 0.5 to 5.0 moles per mole of the alkenyl groups present in the composition.

6. A pattern-making mold comprising a cured product of the composition of claim 1.

* * * * *